United States Patent
Dalla Piazza et al.

(10) Patent No.: US 9,885,518 B2
(45) Date of Patent: Feb. 6, 2018

(54) PIVOTALLY-LEVERAGED MANUAL CENTRIFUGAL DRIVE

(75) Inventors: Enrico Dalla Piazza, Schneisingen (CH); Edward H. Kilduff, New York, NY (US); Chi Ming Tse, New Territories (CN); Gareth Brown, Brooklyn, NY (US)

(73) Assignee: Enrico Dalla Piazza, Nürensdorf (CH)

( * ) Notice: Subject to any disclaimer, the term of this patent is extended or adjusted under 35 U.S.C. 154(b) by 1306 days.

(21) Appl. No.: 12/069,374

(22) Filed: Feb. 7, 2008

(65) Prior Publication Data

US 2008/0188365 A1   Aug. 7, 2008

Related U.S. Application Data

(60) Provisional application No. 60/900,367, filed on Feb. 7, 2007.

(51) Int. Cl.
*A47J 43/24* (2006.01)
*F26B 11/02* (2006.01)

(52) U.S. Cl.
CPC ............. *F26B 11/02* (2013.01); *A47J 43/24* (2013.01); *Y10T 74/18088* (2015.01); *Y10T 74/18128* (2015.01)

(58) Field of Classification Search
USPC ......... 99/495, 509, 510, 511, 512, 513, 536; 241/168, 169.1
See application file for complete search history.

(56) References Cited

U.S. PATENT DOCUMENTS

| | | |
|---|---|---|
| 507,903 A | 10/1893 | Hancock |
| 1,194,318 A | 8/1916 | Power |
| 1,511,287 A | 10/1924 | Lindley |
| 1,619,550 A | 3/1927 | Thebaud et al. |
| 2,246,054 A | 6/1941 | Marty |
| 2,347,383 A | 4/1944 | Wiegratz |
| 2,407,819 A | 9/1946 | Dolan |
| 2,592,481 A | 4/1952 | Spencer et al. |
| 2,796,987 A | 6/1957 | Meyer |

(Continued)

FOREIGN PATENT DOCUMENTS

| | | |
|---|---|---|
| CH | 351731 | 3/1961 |
| CH | 353509 | 5/1961 |

(Continued)

*Primary Examiner* — Anne M Antonucci
*Assistant Examiner* — Renee LaRose
(74) *Attorney, Agent, or Firm* — Law Office of Thomas J. Brindisi (57) ABSTRACT

A pivotally-leveraged manual centrifugal drive according to a preferred embodiment of the invention for use with a bowl and a basket formed to nest within the bowl, comprising: a) a housing formed to mate with the bowl; b) a rotation wheel rotatably connected to the housing, formed to mate with the basket, and having a plane of rotation; c) a handle pivotally attached to the housing and oriented to move in a plane that is substantially perpendicular to the plane of rotation of the rotation wheel; and d) gears connecting the handle to the rotation wheel. Also disclosed are an automatic clutch that engages the rotation wheel only when the handle is moved in one direction, and a braking mechanism that includes a disk having a diameter substantially smaller than the rotation wheel.

32 Claims, 8 Drawing Sheets

(56) References Cited

U.S. PATENT DOCUMENTS

| | | | |
|---|---|---|---|
| D183,384 S | 8/1958 | de Mille | |
| 3,123,114 A | 3/1964 | Andrews et al. | |
| 3,139,917 A | 7/1964 | Elmore | |
| 3,156,278 A | 11/1964 | Otto | |
| 3,581,790 A | 6/1971 | del Conte | |
| 3,729,096 A | 4/1973 | Fitzner et al. | |
| 3,885,321 A | 5/1975 | Foulneteau | 34/58 |
| 3,990,358 A | 11/1976 | Cade | |
| 4,007,751 A | 2/1977 | Commiant | |
| 4,101,978 A | 7/1978 | Brackman | |
| 4,124,310 A | 11/1978 | Brackman et al. | |
| 4,209,916 A | 7/1980 | Doyel | 34/58 |
| 4,264,215 A | 4/1981 | Nunlist et al. | |
| D260,346 S | 8/1981 | Lebowitz | |
| 4,374,574 A * | 2/1983 | David | 241/169.1 |
| 4,386,740 A | 6/1983 | Van Deursen | |
| 4,442,764 A | 4/1984 | Bos et al. | |
| 4,682,740 A | 7/1987 | Conigliaro et al. | |
| 4,768,429 A | 9/1988 | Federighi | |
| 4,905,465 A | 3/1990 | Jones et al. | |
| D315,657 S | 3/1991 | Ruttimann | |
| 5,064,535 A | 11/1991 | Hsu | 210/380.1 |
| 5,082,190 A | 1/1992 | Chen | |
| 5,245,726 A | 9/1993 | Rote et al. | |
| 5,307,738 A | 5/1994 | Amstad | |
| 5,360,170 A | 11/1994 | Cartellone | |
| 5,401,159 A | 3/1995 | Hsu | |
| 5,435,237 A | 7/1995 | Huang | |
| 5,562,025 A * | 10/1996 | Bull et al. | 99/495 |
| 5,562,256 A | 10/1996 | Wolman et al. | |
| 5,617,783 A | 4/1997 | Beeler | |
| 5,735,193 A | 4/1998 | Chang | |
| 5,782,416 A | 7/1998 | Nejatbina | |
| D396,992 S | 8/1998 | Lallemand | |
| 5,823,672 A | 10/1998 | Barker | |
| 5,839,826 A | 11/1998 | Eubanks | |
| 5,842,651 A | 12/1998 | Smothers | |
| 5,865,109 A | 2/1999 | Bull | 99/495 |
| 5,904,090 A | 5/1999 | Lillelund et al. | 99/495 |
| 5,920,997 A * | 7/1999 | Girtman | 33/414 |
| 5,960,709 A | 10/1999 | Yip | |
| 5,996,483 A | 12/1999 | Yip | |
| 6,000,650 A | 12/1999 | Penaranda et al. | |
| 6,018,883 A | 2/2000 | Mulhauser | 34/58 |
| 6,035,771 A | 3/2000 | Conran et al. | |
| D434,597 S | 12/2000 | Yip | |
| 6,374,502 B1 * | 4/2002 | Holcomb et al. | 30/417 |
| 6,510,785 B1 | 1/2003 | Margolin | |
| 6,622,618 B1 | 9/2003 | Glucksman et al. | |
| 6,877,684 B2 * | 4/2005 | Wu | 241/169.1 |
| 6,899,021 B2 | 5/2005 | Riede | |
| 7,681,495 B2 | 3/2010 | Wan et al. | |
| 2005/0023389 A1 | 2/2005 | Wu | |
| 2006/0144257 A1 | 7/2006 | Cheng et al. | 99/511 |
| 2006/0207441 A1 * | 9/2006 | Mulhauser et al. | 99/495 |
| 2009/0090254 A1 | 4/2009 | Herren | |

FOREIGN PATENT DOCUMENTS

| | | |
|---|---|---|
| EP | 0176450 A1 | 4/1986 |
| EP | 1400196 A2 | 3/2004 |
| FR | 743906 | 4/1933 |
| FR | 1012262 | 7/1952 |
| FR | 1259498 | 3/1961 |
| FR | 2642294 | 8/1990 |
| FR | 2713069 | 6/1995 |
| GB | 405485 | 2/1934 |
| GB | 2355946 A | 5/2001 |
| JP | 57-26670 | 6/1982 |
| JP | 62100989 | 5/1987 |
| JP | 02-046276 | 2/1990 |
| JP | 3022041 | 12/1995 |
| JP | 10-174647 | 6/1998 |
| WO | 02/085168 A1 | 10/2002 |
| WO | 2004073474 | 9/2004 |
| WO | 2005115209 A1 | 12/2005 |
| WO | 2007128154 | 11/2007 |
| WO | 2007128155 | 11/2007 |

* cited by examiner

PIVOTALLY-LEVERAGED MANUAL CENTRIFUGAL DRIVE

RELATED APPLICATION

This application claims the benefit of U.S. provisional patent application Ser. No. 60/900,367 filed Feb. 7, 2007 and entitled "Manually-Driven Centrifugal Drying Device."

FIELD OF THE INVENTION

The present invention relates to devices used to spin items centrifugally, and more particularly, to a pivotally-leveraged manual centrifugal drive such as for use in drying items such as leafy vegetables and other food items.

BACKGROUND OF THE INVENTION

U.S. Pat. No. 5,865,109 to Bull and U.S. Pat. No. 5,904,090 to Lillelund et al. disclose manually-driven centrifugal drying devices that are hand-cranked by a handle that is integrated with the lid assembly and oriented for a direction of movement in a plane parallel with the lid assembly. U.S. Pat. No. 6,018,883 to Mulhauser discloses a manually-driven centrifugal drying device with a handle that is oriented for movement perpendicular to the lid assembly, but the mechanism does not provide leverage to attain rapid movement of the spinner. U.S. Patent Application Publication No. 2006/0144257 to Cheng et al. discloses a manually-driven centrifugal drying device with a pull-cord drive that generates leverage but is oriented for movement not perpendicular to the lid assembly.

SUMMARY OF THE INVENTION

A pivotally-leveraged manual centrifugal drive according to a preferred embodiment of the invention for use with a bowl and a basket formed to nest within the bowl comprises: a) a housing formed to mate with the bowl; b) a rotation wheel rotatably connected to the housing, formed to mate with the basket, and having a plane of rotation; c) a handle pivotally attached to the housing and oriented to move in a plane that is substantially perpendicular to the plane of rotation of the rotation wheel; and d) gears connecting the handle to the rotation wheel. The device may also include an automatic clutch that engages the rotation wheel only when the handle is moved in one direction. A further optional feature is a mechanism for decelerating the rotation wheel, which includes a disk having a diameter substantially smaller than the rotation wheel.

BRIEF DESCRIPTION OF THE DRAWINGS

FIGS. 1-8b depict an embodiment of the present invention of a pivotally-leveraged manual centrifugal drive for use with a bowl and basket nested within the bowl, wherein:

DETAILED DESCRIPTION OF A PREFERRED EMBODIMENT

Figure 6:
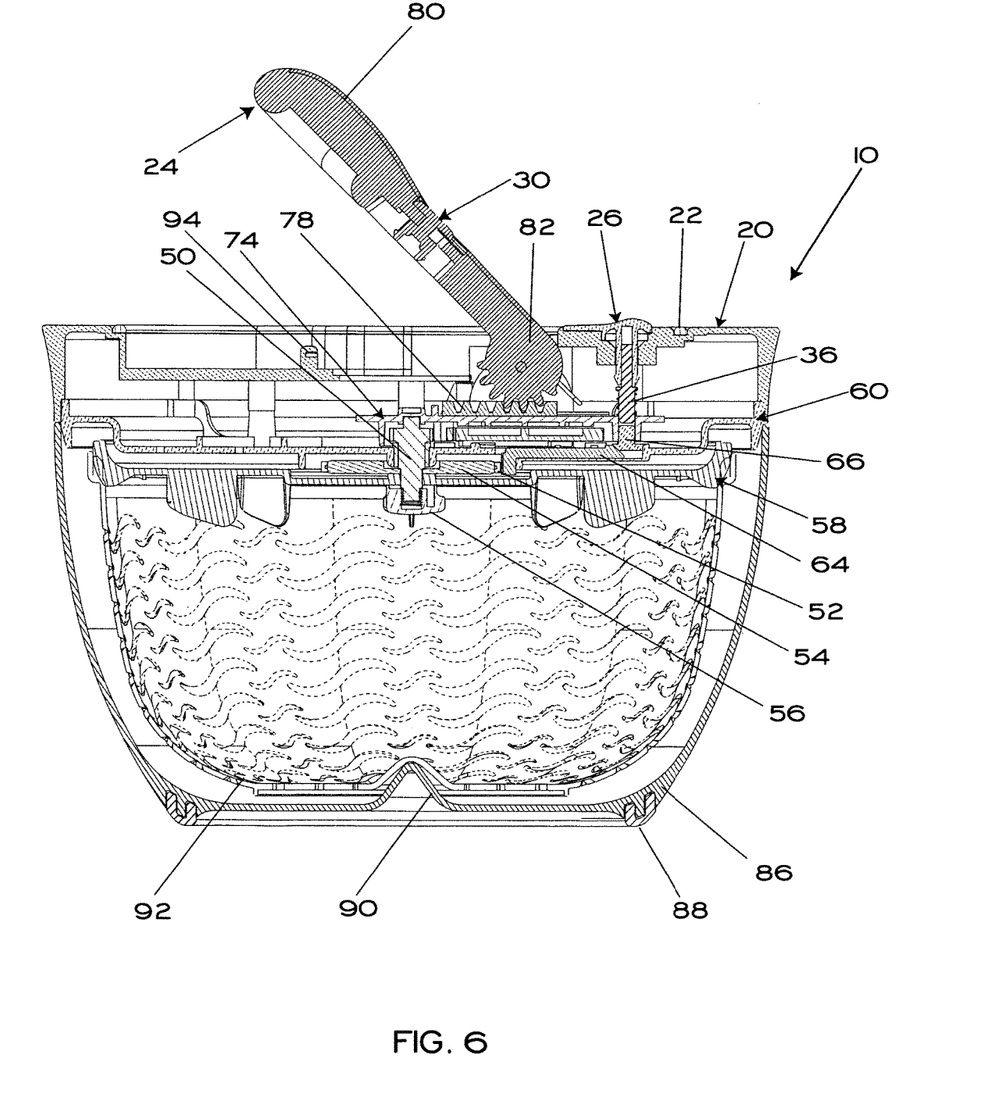
FIG. 6 is a sectional side view, showing a bowl and a basket mated with the pivotally-leveraged manual centrifugal drive.

FIGS. 1-8b depict an embodiment of the present invention of a pivotally-leveraged manual centrifugal drive 20 for use with a bowl 86 and basket 92 nested within the bowl so as to form a manually-driven centrifugal drying device 10. As shown in FIG. 6, the pivotally-leveraged manual centrifugal drive 20 mates with a bowl 86 having solid walls and a conical protuberance 90 at its bottom, upon which the basket 92 (which is perforated and nests within the bowl 86) can spin during use. The bowl 86 may also include an annular high-friction footing 88 at its base. As manually-driven centrifugal drying devices generally including a spinning basket nested within a bowl are well-known, the present drawings and description are directed to the inventive pivotally-leveraged manual centrifugal drive 20 that spins the basket 92.

Figure 1:
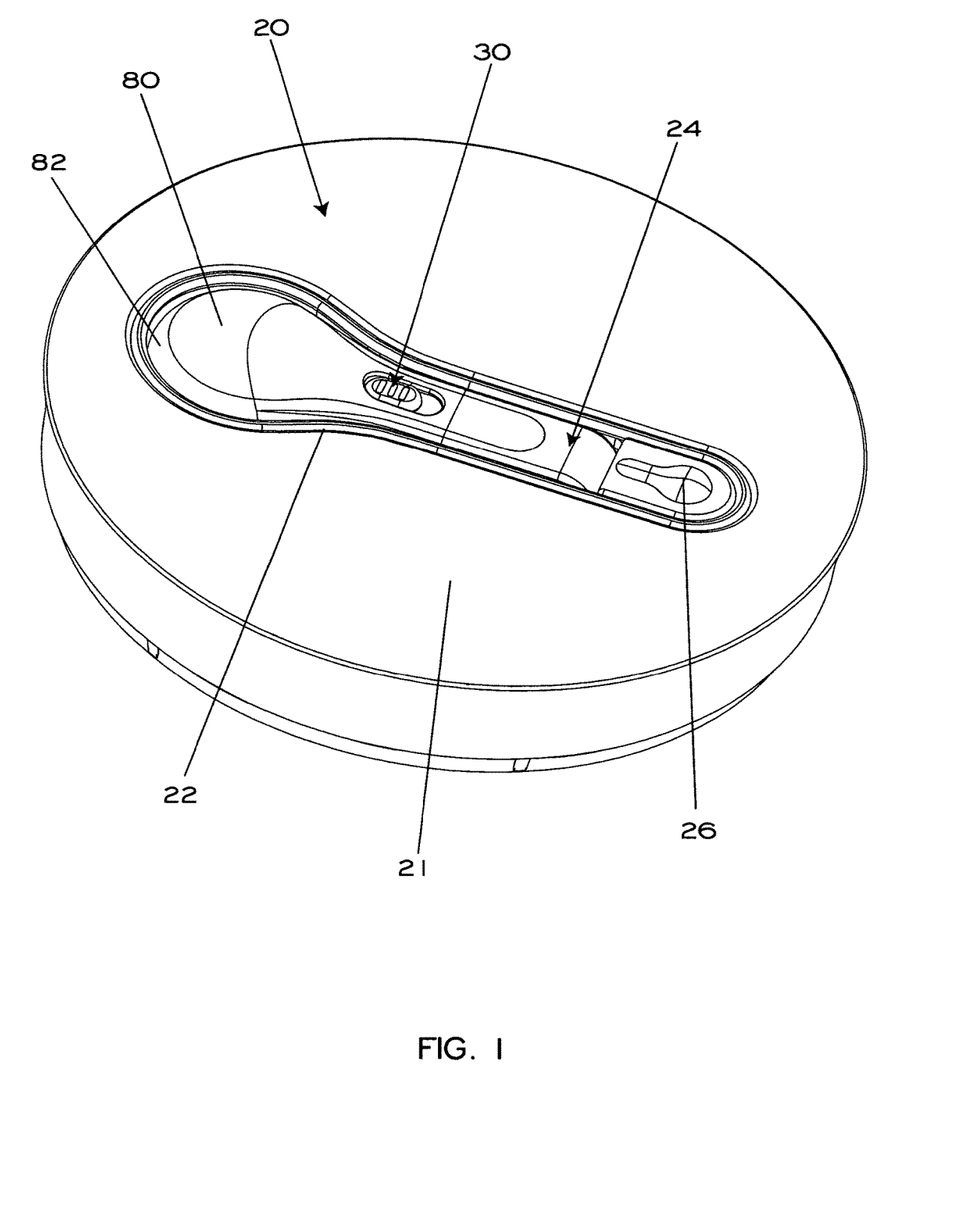
FIG. 1 is a top perspective view showing the handle locked down.
Figure 2:
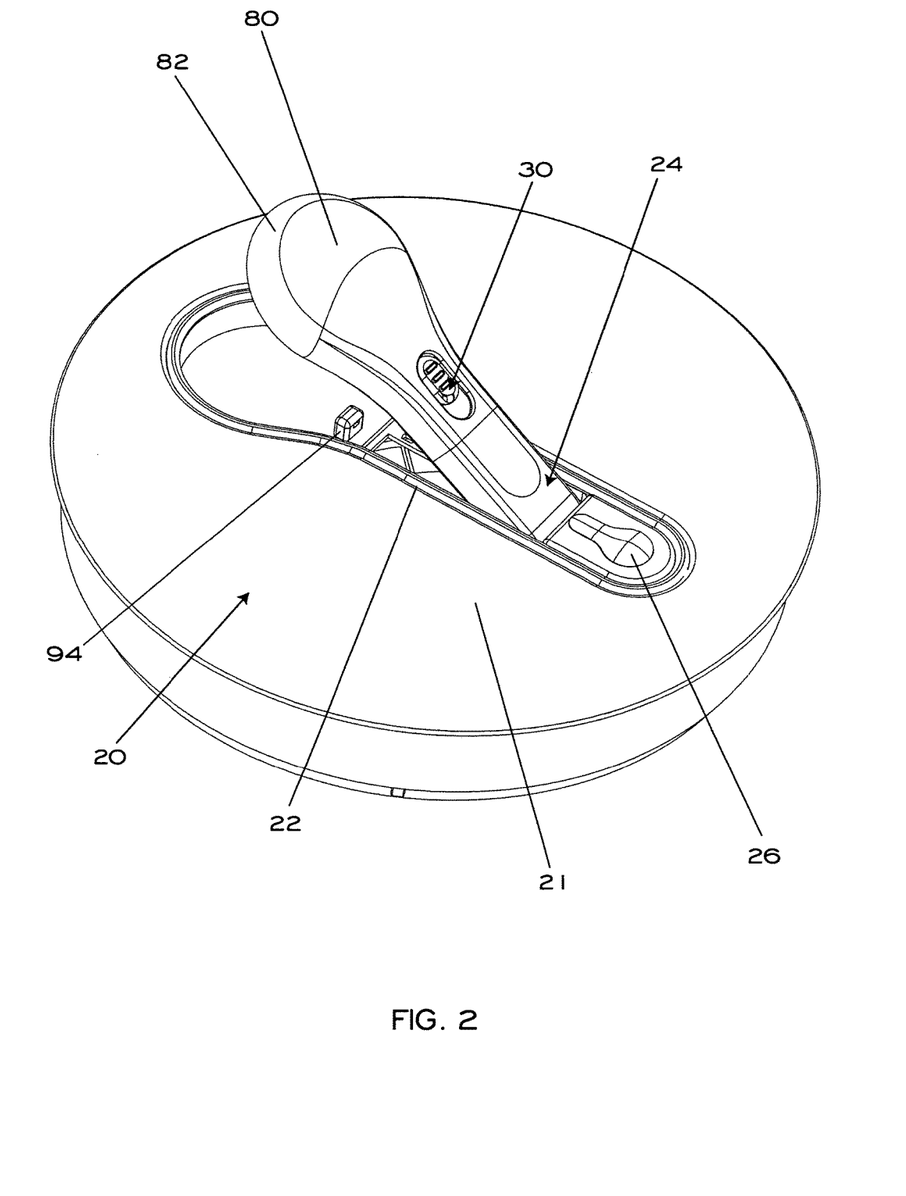
FIG. 2 is a top perspective view showing the handle partly extended upwardly.
Figure 3:
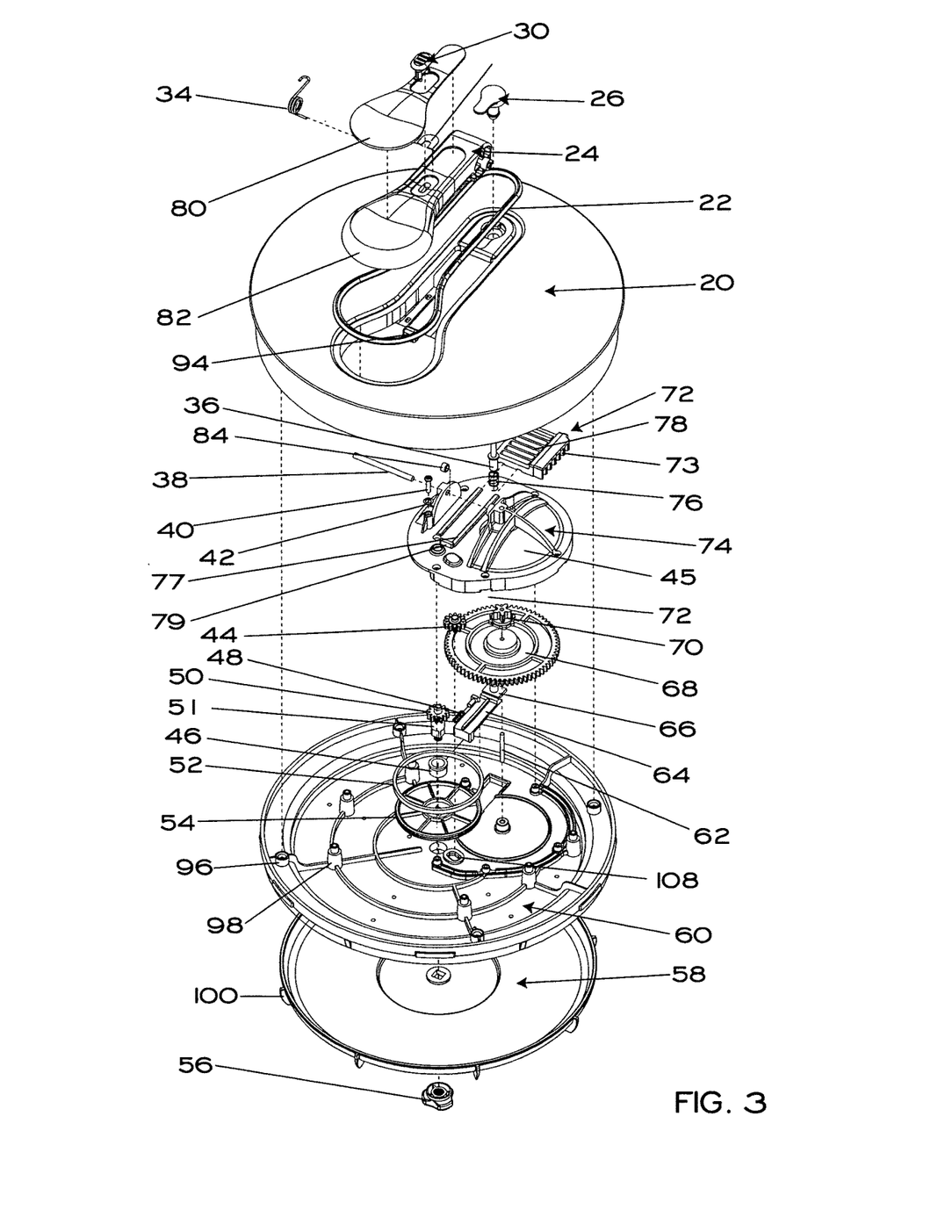
FIG. 3 is a top perspective exploded view.
Figure 4:
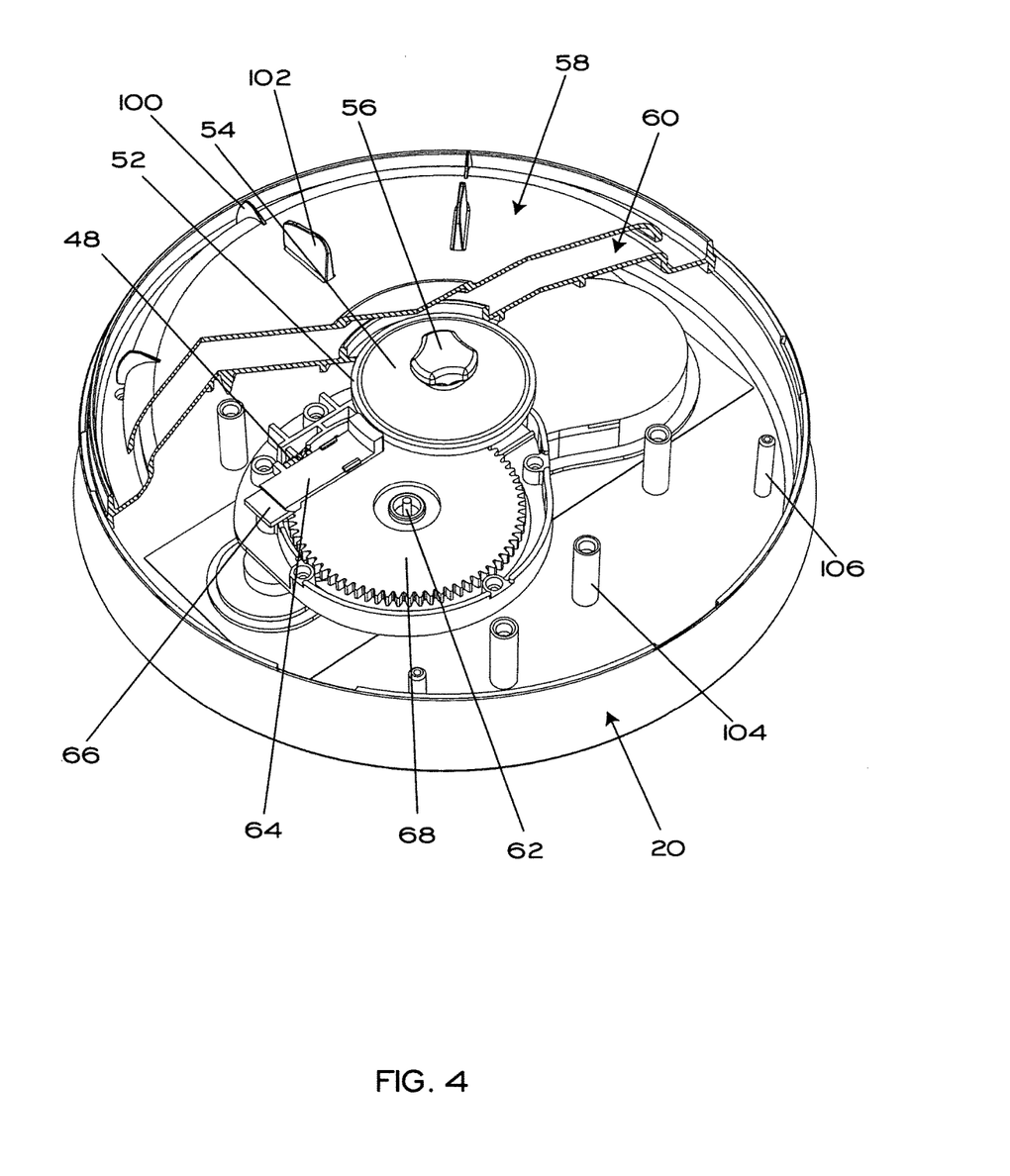
FIG. 4 is a bottom perspective partial cutaway view, particularly showing the braking mechanism.
Figure 5A:
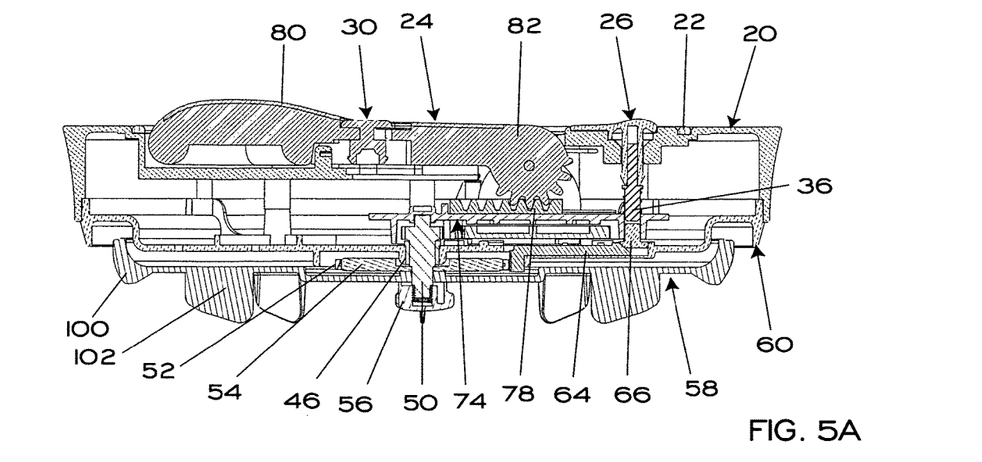
FIGS. 5A and 5B are sectional side views, respectively showing the handle in the locked-down position and in a partly-extended position.
Figure 5B:
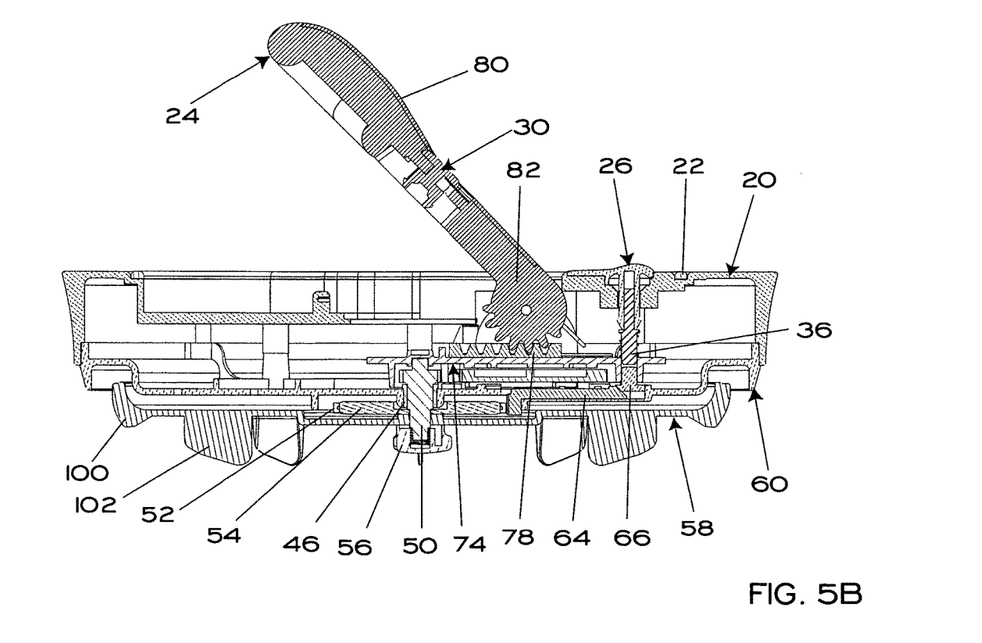
Figure 7:
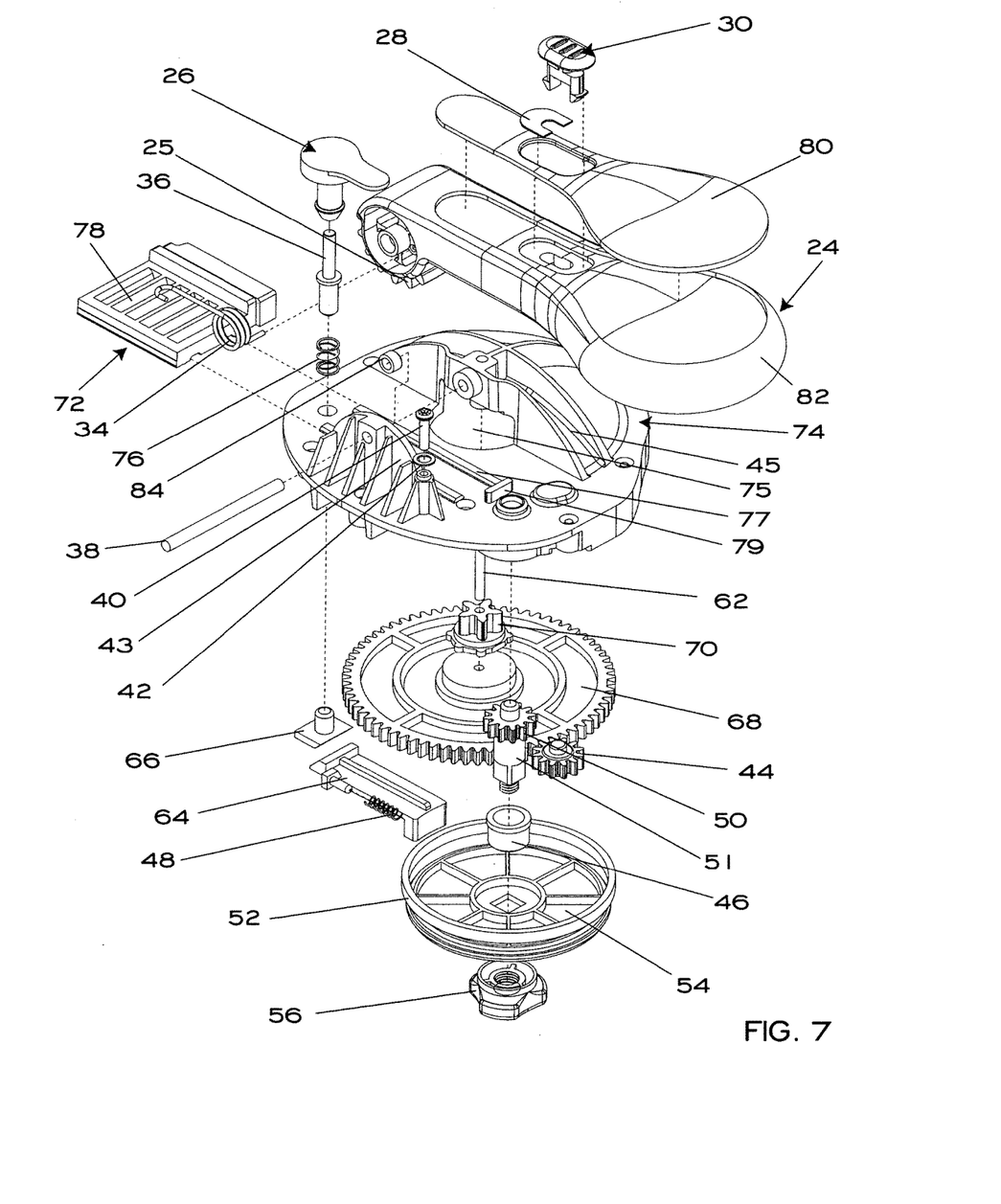
FIG. 7 is a top perspective exploded view (from a different angle than FIG. 3) of the "drive-train."

FIGS. 1 and 2 show a top perspective view of the pivotally-leveraged manual centrifugal drive 20, which primarily consists of a generally flat housing 21 and a handle 24 pivotally attached to the pivotally-leveraged manual centrifugal drive 20. A locking button 30 slides forward and backward on the handle 24 and includes a protruding pin (not shown) that inserts (when the handle 24 is in the down position as shown in FIG. 1 and the button 30 is moved forward) in a corresponding notch in the abutment 94, so as to lock the handle in the down position shown in FIG. 1. In the preferred embodiment, the handle can pivot further upwardly than shown in FIG. 2, such as to approximately a 90 degree angle with the housing 21. The pivotally-leveraged manual centrifugal drive 20 also includes a brake button 26, further described below. As best seen in FIGS. 3 and 7, the handle 24 is biased toward the fully upwardly pivoted position by a spring 34. (The straight end of the spring 34 is engaged within a corresponding hole in the cylindrical opening in the end of the handle 24 while the longer, curved end is retained on a screw 40 along with a ring 42). The handle 24 pivots on a shaft 38 (which is affixed at each end within corresponding holes formed in stanchion 43 and dome 45, with a bushing 84 placed on the shaft 38 to bear the central portion of spring 34), and a spring 34 urges the handle 24 upwardly so that as soon as a user stops pushing the handle 24 downwardly towards the pivotally-leveraged manual centrifugal drive 20, the handle 24 pivots upwardly back to an extended position. Rotation wheel 58 is driven uni-directionally by manual operation of the handle 24, and its fins 100 engage the basket 92 so that it rotates within the bowl 86. (Fins 102 are adapted to engage an optional, smaller-diameter "berry basket"—not shown— that can be nested within the basket 92).

Figure 8A:
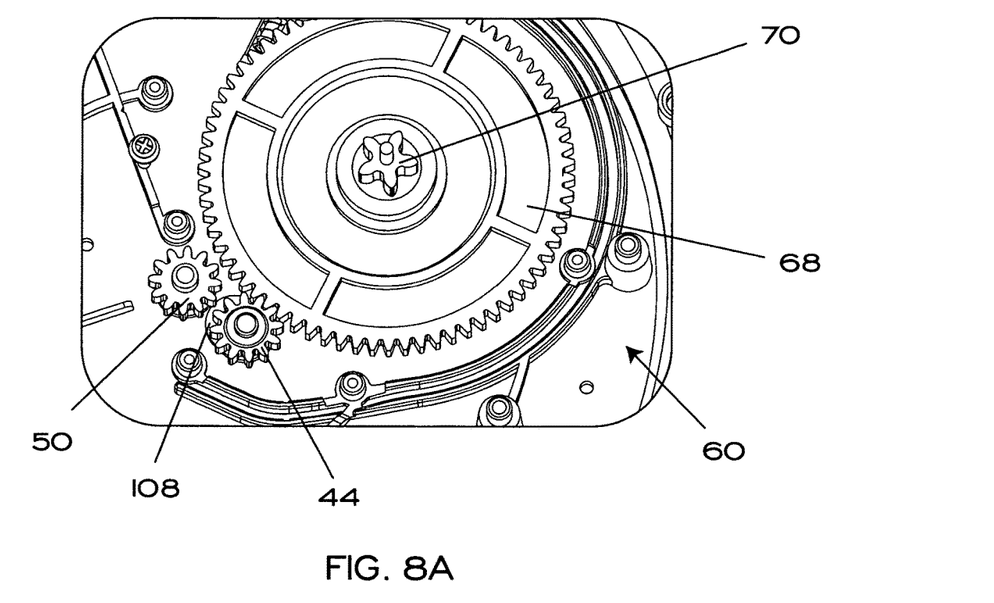
FIGS. 8A and 8B are top perspective close-up views of the gears, respectively showing the clutch cog in an engaged position and an unengaged position.
Figure 8B:
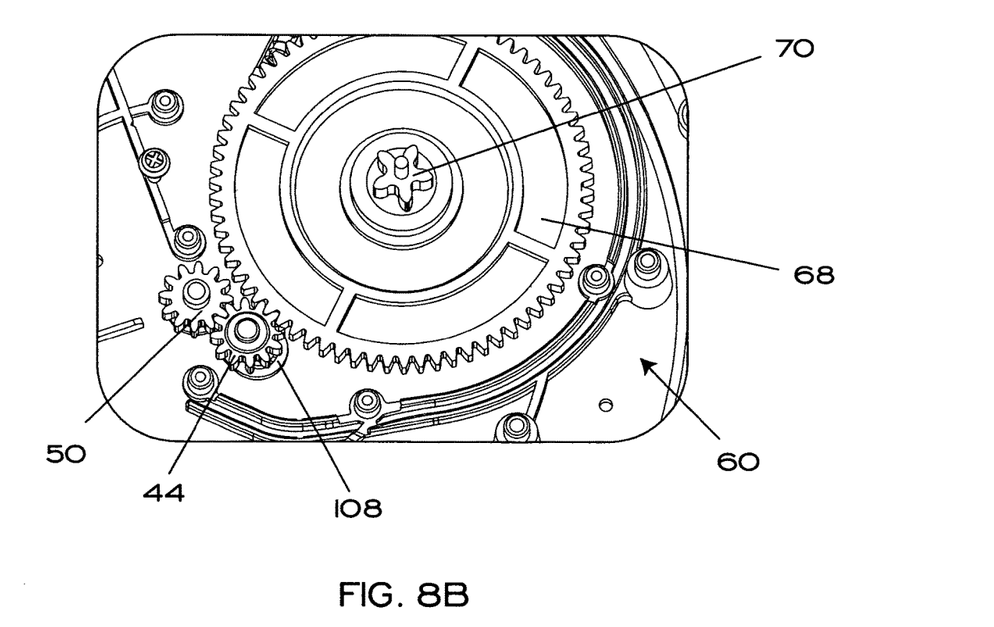

With particular reference to FIGS. 3-5B and 7, the transfer of force from manual operation of the handle 24 into the rotation wheel 58 is described. The teeth 25 at the pinion end 82 of the handle 24 (see FIGS. 5A and 5B), which are engaged with the teeth 78 of a rack 72, drive the rack 72 (which is free to slide on tracks 77 until hitting an abutment 79) in the direction away from axle 51 when the handle 24 is pushed downwardly toward the position shown in FIG. 5A. As seen in FIGS. 3 and 7, teeth 73 of the rack 72 engage (through aperture 75 in dome 45) pinion 70, which is fixedly attached to a drive wheel 68 and is stabilized on an axle 62 (which is received in a corresponding hole in the top interior of gear housing 74 such that the axle 62 can rotate within the hole). (Housing closure 60 is fixedly attached to housing 21 such as by locating pegs 106 in guide holes 96 and screws (not shown) in guides 98 and internally-threaded stanchions 104, and gear housing 74 is in turn fixedly attached to housing closure 60 such as by screws and stanchions). Thus downward and upward pivoting of the handle 24 produce forward and backward motion of the rack 72, producing resulting clockwise and counterclockwise rotation of the drive wheel 68. Clutch cog 44 clutches gear 50 only when drive wheel 68 is rotated clockwise as viewed in FIGS. 7-8B, however, because the ends of its axle are free to move within a slightly arcuate path 108 defined in housing closure 60 (and a corresponding slightly arcuate path defined in the opposing portion of the gear housing 74, the reverse outline of which is visible on the other side of gear housing 74 in FIGS. 3 and 7). Counterclockwise rotation of drive wheel 68 urges clutch cog 44 along slightly arcuate path 108 in the direction away from gear 50 and axle 51, and clockwise rotation urges it toward gear 50. As shown in FIG. 8B, when clutch cog 44 is clutching gear 50 (i.e., during clockwise rotation of the drive wheel 68 as viewed in FIGS. 7-8B), the "drive-train" shown in FIG. 7 is fully connected and produces leveraged revolution of gear 50 and rotation wheel 58 to which axle 51 is fixedly attached by endcap 56 (with a bushing 46 provided between the axle 51 and housing closure 60). As shown in FIG. 8A, when clutch cog 44 is not clutching gear 50 (i.e., during and after counterclockwise rotation of the drive wheel 68 as viewed in FIGS. 7-8B), the "drive-train" shown in FIG. 7 is not connected such that rotation wheel 58 (to which axle 51 is fixedly attached) is therefore free to spin irrespective of the motion of the rest of the drive-train and gears. Preferably for added stability (not shown), instead of a single drive gear 68, a symmetric, counter-rotating double-drive gear may be used, each having a pinion driven by teeth on opposing sides of a wider rack. One of ordinary skill also of course will recognize that a variety of other suitable mechanisms known in the art readily could be adapted as an alternative means of transferring the pivotal motion of the handle 24 into rotation of rotation wheel 58.

In a further optional feature, a brake means including a brake disk 54 can be employed to indirectly decelerate the rotation wheel 58. In the embodiment shown in the Figures, the brake disk 54 includes a high-friction tire 52 and is indirectly fixedly attached to the rotation wheel 58 (e.g., by endcap 56 screwed onto axle 51 or other suitable means such as a snap-lock). The tire 52 is slowed when the ram 64 impinges upon it. The ram 64 is biased against contact with the tire 52 by a spring 48, and is activated by manual pressure on the brake button 26. Manual pressure on the brake button 26 plunges a rod 36 downwardly against the bias of the spring 76, moving a wedge 66 downwardly. Downward movement of the wedge 66 forces the complementary wedge-shaped face on the ram 64 to drive the other end of the ram 64 into contact with the tire 52, slowing the disk 54, and thus the axle 51, and thus the rotation wheel 58.

It is noted that the majority of the parts of the described embodiment of a pivotally-leveraged manual centrifugal drive preferably can be made of plastics that are suitably hard, strong, and durable, with only limited parts (such as the axle 62, gear 50, teeth 73, screws, springs, etc.) being optionally or preferably made of metals such as steel and/or zinc.

Although the present invention has been described in detail in the context of a preferred embodiment of a pivotally-leveraged manual centrifugal drive for use with a nested basket and bowl so as to form a manually-driven centrifugal drying device, one skilled in the art will appreciate that numerous variations, modifications, and other applications are also within the scope of the present invention. Thus, the foregoing detailed description is not intended to limit the invention in any way, which is limited only by the following claims and their legal equivalents.

What is claimed is:

1. A pivotally-leveraged manual centrifugal drive for use with a bowl having an open top and a basket formed to nest within the bowl, comprising:
   a) a housing having a top, and having a bottom that is formed to mate with the top of the bowl;
   b) a rotation wheel rotatably connected to said bottom of said housing, formed to mate with the basket, and having a plane of rotation;
   c) a handle pivotally attached to said housing at a handle axis in said top of said housing and moveable, between an extended position and a down position, within a plane that is substantially perpendicular to said plane of rotation, wherein when in said down position said handle lies in a plane that is substantially parallel to said plane of rotation; and
   d) gears connecting said handle to said rotation wheel.

2. The pivotally-leveraged manual centrifugal drive of claim 1, further comprising a rack.

3. The pivotally-leveraged manual centrifugal drive of claim 1, further comprising a pinion.

4. The pivotally-leveraged manual centrifugal drive of claim 1, wherein the bowl is solid-walled and the basket is perforated.

5. The pivotally-leveraged manual centrifugal drive of claim 4, wherein said rotation wheel includes fins.

6. The pivotally-leveraged manual centrifugal drive of claim 1, further comprising a clutch.

7. The pivotally-leveraged manual centrifugal drive of claim 6, wherein said handle is biased toward the extended position.

8. The pivotally-leveraged manual centrifugal drive of claim 6, wherein said handle, gears, clutch, and rotation wheel are configured such that movement of said handle only drives said rotation wheel in one direction.

9. The pivotally-leveraged manual centrifugal drive of claim 8, wherein said clutch comprises a cog with an axle having ends set within a path.

10. The pivotally-leveraged manual centrifugal drive of claim 9, wherein said path has a first and a second end, and said cog is connected to said rotation wheel when said cog is at said first end of said path, and said cog is not connected to said rotation wheel when said cog is at said second end of said path.

11. The pivotally-leveraged manual centrifugal drive of claim 1, wherein said handle is biased.

12. The pivotally-leveraged manual centrifugal drive of claim 1, further comprising means for decelerating the rotation wheel, wherein said means includes a disk.

13. The pivotally-leveraged manual centrifugal drive of claim 12, wherein said disk has a diameter that is substantially smaller than the diameter of said rotation wheel.

14. A pivotally-leveraged manual centrifugal drive for use with a bowl having an open top and a basket formed to nest within the bowl:
   a) a housing having a top, and having a bottom that is formed to mate with the top of the bowl;
   b) a rotation wheel rotatably connected to said bottom of said housing, formed to mate with the basket, and having a plane of rotation;
   c) a handle pivotally attached to said housing at a handle axis in said top of said housing and moveable, between an extended position and a down position, within a plane that is substantially perpendicular to said plane of rotation, wherein when in said down position said handle lies in a plane that is substantially parallel to said plane of rotation; and
   d) means for transferring pivotal force exerted on said handle into rotation of said rotation wheel.

15. The pivotally-leveraged manual centrifugal drive of claim 14, further comprising a clutch.

16. The pivotally-leveraged manual centrifugal drive of claim 15, wherein said handle is biased toward the extended position.

17. The pivotally-leveraged manual centrifugal drive of claim 15, wherein said handle, means for transferring, clutch, and rotation wheel are configured such that movement of said handle only drives said rotation wheel in one direction.

18. The pivotally-leveraged manual centrifugal drive of claim 17, wherein said clutch comprises a cog with an axle having ends set within a path.

19. The pivotally-leveraged manual centrifugal drive of claim 14, wherein said handle is biased.

20. The pivotally-leveraged manual centrifugal drive of claim 14, wherein said means for transferring comprises gears.

21. A pivotally-leveraged manual centrifugal drive for use with a container having a bottom and an open top, comprising:
   a) a housing having a top, and having a bottom that is formed to mate with the top of the container;
   b) a rotating member for use with food items and formed to sit rotatably within the container;
   c) a rotating drive at said bottom of said housing, formed to engage said rotating member when said rotating member is seated within the container and said bottom of said housing is mated with the top of the container, and defining a drive axis of rotation; said rotating drive being oriented such that when said rotating member is seated within the container and said bottom of said housing is mated with the top of the container and said rotating drive is engaged with said rotating member, said drive axis of rotation runs centrally through the open top and the bottom of the container;
   d) a handle having two ends one of which is pivotally attached to said top of said housing such that said handle is oriented for a direction of pivotal movement between an extended position and a down position, the range of said movement defining a handle movement plane that is substantially perpendicular to a plane that is perpendicular to said drive axis of rotation, wherein when in said down position both ends of said handle are intersected by a plane that is substantially perpendicular to said drive axis of rotation; and
   e) gears and a clutch connecting said handle to said rotating drive.

22. The pivotally-leveraged manual centrifugal drive of claim 21, further comprising a rack.

23. The pivotally-leveraged manual centrifugal drive of claim 21, further comprising a pinion.

24. The pivotally-leveraged manual centrifugal drive of claim 21, wherein the container for which the device is for use with is a solid-walled bowl and wherein said rotating member is a perforated basket.

25. The pivotally-leveraged manual centrifugal drive of claim 24, wherein said rotating drive includes fins formed to engage said perforated basket.

26. The pivotally-leveraged manual centrifugal drive of claim 21, wherein said drive is configured so that said clutch is not engaged when said handle moves upwardly.

27. The pivotally-leveraged manual centrifugal drive of claim 26, wherein said clutch comprises a cog with an axle having ends set within a path.

28. The pivotally-leveraged manual centrifugal drive of claim 27, wherein said path has a first and a second end, and said cog is connected to said rotating drive when said cog is at said first end of said path, and said cog is not connected to said rotating drive when said cog is at said second end of said path.

29. The pivotally-leveraged manual centrifugal drive of claim 21, wherein said handle is biased toward the extended position.

30. The pivotally-leveraged manual centrifugal drive of claim 29, wherein said handle, gears, clutch, and rotating drive are configured such that downward and upward pivoting of said handle uni-directionally rotates said rotating member.

31. The pivotally-leveraged manual centrifugal drive of claim 21, further comprising means for braking the rotating drive, wherein said means includes a disk.

32. The pivotally-leveraged manual centrifugal drive of claim 21, wherein said pivotal attachment of said handle to said top of said housing includes a shaft.

* * * * *